(12) United States Patent
Thomson

(10) Patent No.: US 8,395,965 B2
(45) Date of Patent: Mar. 12, 2013

(54) METHOD OF DETERMINING PROPERTIES OF THE EARTH

(75) Inventor: Colin Thomson, Cambridge (GB)

(73) Assignee: WesternGeco L.L.C., Houston, TX (US)

(*) Notice: Subject to any disclaimer, the term of this patent is extended or adjusted under 35 U.S.C. 154(b) by 695 days.

(21) Appl. No.: 12/447,683

(22) PCT Filed: Aug. 21, 2007

(86) PCT No.: PCT/GB2007/003190
§ 371 (c)(1),
(2), (4) Date: Jan. 5, 2010

(87) PCT Pub. No.: WO2008/053135
PCT Pub. Date: May 8, 2008

(65) Prior Publication Data
US 2010/0110830 A1    May 6, 2010

(30) Foreign Application Priority Data

Nov. 4, 2006   (GB) .................................. 0622002.4

(51) Int. Cl.
*G01V 1/38* (2006.01)
*G01V 1/30* (2006.01)
(52) U.S. Cl. ........................................ 367/21
(58) Field of Classification Search ............... 367/21, 367/51–53
See application file for complete search history.

(56) References Cited

U.S. PATENT DOCUMENTS

| | | | | |
|---|---|---|---|---|
| 5,138,584 A * | 8/1992 | Hale | ............... | 367/53 |
| 5,235,555 A | 8/1993 | Albertin | | |
| 5,490,120 A * | 2/1996 | Li et al. | ............... | 367/53 |
| 6,041,668 A | 3/2000 | Guieze et al. | | |
| 6,278,950 B1 * | 8/2001 | Kim et al. | ............... | 367/47 |
| 7,400,553 B1 * | 7/2008 | Jin et al. | ............... | 367/53 |
| 8,116,168 B1 * | 2/2012 | Luo et al. | ............... | 367/50 |
| 2010/0110830 A1 * | 5/2010 | Thomson | ............... | 367/21 |
| 2010/0256916 A1 * | 10/2010 | Liu et al. | ............... | 702/11 |
| 2011/0110190 A1 * | 5/2011 | Thomson et al. | ............... | 367/38 |
| 2011/0273959 A1 * | 11/2011 | Jin et al. | ............... | 367/38 |

FOREIGN PATENT DOCUMENTS

GB    2443436 A  *  5/2008

OTHER PUBLICATIONS

Stefani; Turning-ray tomography; Geophysics (Nov.-Dec. 1995) vol. 60, Issue: 6; pp. 1917-1929 (Abstract only).*

Stadtlander et al.; Turning waves and crustal reflection profiling; Geophysics (Jan.-Feb. 1997) vol. 62, Issue: 1; pp. 335-341 (Abstract only).*

Akcelik et al., "Parallel multiscale Gauss-Newton-Krylov methods for inverse wave propagation," Proceedings of ACM/IEEE SC, 2002: pp. 1-15.

Akcelik et al., "High resolution forward and inverse earthquake modeling on terascale computers," Proceedings of ACM/IEEE SC, 2003: pp. 1-21.

(Continued)

*Primary Examiner* — Daniel Pihulic

(57) ABSTRACT

There is provided a method of direct waveform inversion of turning waves (311, 312, 313) to determine parameters characterizing properties of the earth or sub-sections of the earth, particularly of parts of the earth which are capable of trapping hydrocarbons with the inversion yielding from the wavefield of turning waves information representing or being equivalent to velocities or slownesses and/or the gradient of velocities or slownesses, particularly by evaluating wavefield data in the vicinity of turning points (33). The method can be applied sequentially as a survey sinking method.

20 Claims, 5 Drawing Sheets

OTHER PUBLICATIONS

Aki et al., "Chapter 12.1: Travel-time inversion," Quantitative seismology—theory and methods, vol. II, San Francisco: W.H. Freeman and Company, 1980: pp. 643-659.

Aki et al., "Chapter 9.4: Inversion of travel-time data to infer earth structure," Quantitative seismology, second edition, Sausalito: University Science Books, 2002: pp. 413-429.

Amundsen, "Elimination of free-surface related multiples without need of the source wavelet," Geophysics, Jan.-Feb. 2001, vol. 66(1): pp. 327-341.

Bregman et al., "A noniterative procedure for inverting plane-wave reflection data at several angles of incidence using the Riccati equation," Geophysical Prospecting, 1985, vol. 33: pp. 185-200.

Bube et al., "The one-dimensional inverse problem of reflection seismology," SIAM Review, Oct. 1983, vol. 25(4): pp. 497-559.

Clayton et al., "Inversion of refraction data by wave field continuation," Geophysics, Jun. 1981, vol. 46(6): pp. 860-868.

Pratt et al., "Gauss-Newton and full Newton methods in frequency-space seismic waveform inversion," Geophys. J. Int., 1998, vol. 133: pp. 341-362.

Singh et al., "Full waveform inversion of reflection data," Journal of Geophysical Research, Feb. 1989, vol. 94 (B2): pp. 1777-1794.

Sirgue, "Inversion de la forme d'onde dans le domaine fréquentiel de données sismiques grands offsets (Inversion of the waveform in the frequency domain of seismic data large offsets)," Ph.D. thesis, Laboratoires de Géologie, Ecole Normale Supérieure de Paris, 2003: pp. 1-160. Document in English.

Sirgue et al., "Efficient waveform inversion and imaging: A strategy for selecting temporal frequencies," Geophysics, Jan.-Feb. 2004, vol. 69(1): pp. 231-248.

Thomson, "Corrections for grazing rays in 2-D seismic modelling," Geophysical Journal, 1989, vol. 96: pp. 415-446.

Weston, "Wave splitting and the reflection operator for the wave equation in R3," J. Math. Phys., Nov. 1989, vol. 30 (11): pp. 2545-2562.

Combined Search and Examination Report of British Patent Application Serial No. GB0622002.4 dated Feb. 9, 2007: pp. 1-6.

International Search Report and Written Opinion of PCT Application No. PCT/GB2007/003190 dated Jun. 12, 2009: pp. 1-20.

\* cited by examiner

METHOD OF DETERMINING PROPERTIES OF THE EARTH

The present invention relates to methods of determining from seismic signals properties of the earth, particularly velocity or slowness of earth layers. It relates further to the use of turning wave signals within the seismic signals.

BACKGROUND OF THE INVENTION

The primary goal of seismic exploration is to obtain images of subsurface geological formations based upon information gleaned from recordings of a class of acoustic wave signals usually referred to as a seismic wavefield which is purposefully directed into the earth and recorded after having traveled through sections of the earth.

The propagation of the seismic wavefield from the source to the receivers is dominated by geophysical properties of the layers through which the signals travel. The interpretation of the seismic wavefield yields in the first instance acoustic properties of the layers, the most important of which are known as elastic constants, which in turn can be used to determine other properties such as rock type, composition and fluid content, or texture and porosity.

Seismic processing usually involves evaluating the data to identify events and their traveltimes. By matching the detected traveltimes of events and the location of the receivers, velocity information is gained from the data and signals recorded by different receivers can be stacked to increase the signal-to-noise ratio of the recorded data. In a subsequent step, often referred to as imaging or migration, the data is migrated from its position in time to its equivalent position in depth or, more generally, its position in the subsurface. As a result of this seismic processing, an image of the subsurface is generated to be used for stratigraphic and geological interpretation.

Apart from the event- and traveltime-based methods, theoretical and experimental methods have been proposed that attempt an inversion based on the energy content of the recorded signal rather than just the location and time of identified events. These methods are commonly referred to as full wavefield or waveform inversion.

At the most basic level, seismic waveform inversion methods can be classified as either direct or iterative, the latter being more common. The iterative methods need a starting model of the earth. This is usually in the form of a velocity-versus-depth model which must not be too far removed from the true structure. The starting model is modified using a gradient-descent method in order to fit waveforms in a least-squares sense. In 3D problems, the calculations for an iterative process require significant computational resources. An interesting common feature of the iterative results is that during the early stages of data fitting the models are in fact rather smooth and relatively simple.

Direct inversion, by contrast, involves no starting model, no gradient or Fréchet-derivative evaluation and obtains the velocity in one step. The theory of direct inversion is well-established for backscattered waves in a plane layered medium. In fact, for scalar waves in a stratified medium, a single horizontal slowness or angle of incidence suffices to find the velocity structure from the times and amplitudes of reflections. Having more than one incident lateral slowness provides redundancy.

Apart from waves reflected at impedance steps within a subterranean region, there are waves the path of which is reversed from downgoing to upgoing by a gradual velocity change rather than by encountering a sharp reflector. Members of this subset of the recorded wavefield are called "turning waves" or "diving waves".

For turning waves, the only comparable direct inversion result to date has been the famous Herglotz-Wiechert-Bateman explicit formula converting their measured arrival times to the velocity-depth profile outside low-velocity zones, as described in standard textbooks, for example K. Aki & P. G. Richards, "Quantitative Seismology", University Science Books, Sausalitp, Ca., USA, 414-429.

Furthermore, turning waves have been used in migration or imaging of overhanging salt, for example in U.S. Pat. Nos. 5,138,584; 5,235,555 and 5,490,120. These known methods are imaging methods based essentially on phase or traveltime analysis, as in the Herglotz-Wiechert-Bateman formula.

R. W. Clayton and George A McMechan in: "Inversion of refraction data by wave field continuation", Geophysics Vol. 46. No 6 (June 1981), pp. 860-868, described a method of inverting refraction data using downward continuation in a specified background model and iterating to adjust that model. This is analogous to the Herglotz-Wiechert-Bateman traveltime method and is a phase, extrapolation method which does not use the amplitudes or energies. This method does not make use of true amplitude extrapolation. It is also an iterative method relying an initial guess or estimate of a starting velocity model. The authors required ad hoc phase shifts, e.g. $5\pi/4$, to obtain reasonable results.

SUMMARY OF THE INVENTION

A first aspect of the invention provides a method of direct waveform inversion of turning waves to determine parameters characterizing properties of the earth or sub-sections of the earth, particularly of parts of the earth which are capable of trapping hydrocarbons.

In a preferred embodiment, the inversion yields from the wavefield of turning waves information representing or being equivalent to velocities or slownesses and/or the gradient of velocities or slownesses.

In another preferred embodiment, the wavefield is split into up- and downgoing components as part of the inversion process. Alternatively, the processed wavefield includes components representative of the spatial gradient of the wavefield.

In another preferred embodiment, the method includes the step of comparing a parameter or parameters related to the energy of the wavefield, such as energy, energy density or amplitudes, in the vicinity of a turning point of a turning wave. This step may further include the step identifying a turning point of a turning wave.

In another preferred embodiment of the invention, the above described methods are combined with or embedded into a layer-stripping method. In a layer-stripping method a surface is defined as an initial surface and once the properties of the earth or sub-sections of the earth below the initial surface are determined, the wavefield is extrapolated to a lower surface using these properties. The lower surface is then defined as the initial surface for a subsequent repetition of the step.

The two steps of the method are preferably applied concurrently such that the step of determining the properties of a layer and the step of layer-stripping at a given depth are performed before the following layer is stripped.

In a preferred variant of the layer-stripping method, the differences in depth between subsequently defined surfaces are determined dependent upon the highest frequency or shortest wavelength within the wavefield data used to perform the extrapolation.

The preferred frequency range of signals processed in accordance with the invention are low pass or band filtered to restrict the frequency content of the signal to a range of 1 Hz to 50 Hz, more preferably 3 to 20 Hz and even more preferably 3 to 15 or even 10 Hz.

By combining local velocity-versus-depth data set information gained through the application of the invention with data obtained from the analysis of reflected seismic waves, the invention can be used to obtain a more general velocity model of the earth layers, including lateral variations. This model can then be applied in further seismic processing steps known per se to ultimately obtain an image of the location of reflectors within the subsurface of the earth.

The method can be used for p-waves and/or s-waves. Hence, among the parameters which can be determined by the novel methods are p-wave velocities and s-wave velocities. By combining p-wave velocity and s-wave velocity values, other parameters relating to earth properties can be derived using models and relationships known per se. Such parameters include for example Poisson's ratio, which is indicative of rock type and hence of geological significance.

BRIEF DESCRIPTION OF THE DRAWINGS

The present invention will become more fully understood from the detailed description and the accompanying drawings, wherein.

DETAILED DESCRIPTION

In the following description, for the purposes of explanation, the background technologies, a basic example of this invention and various preferred embodiments of the basic example are set forth in order to provide a thorough understanding of the invention. However, it will be apparent that the invention may be practiced without these specific details.

Figure 1:
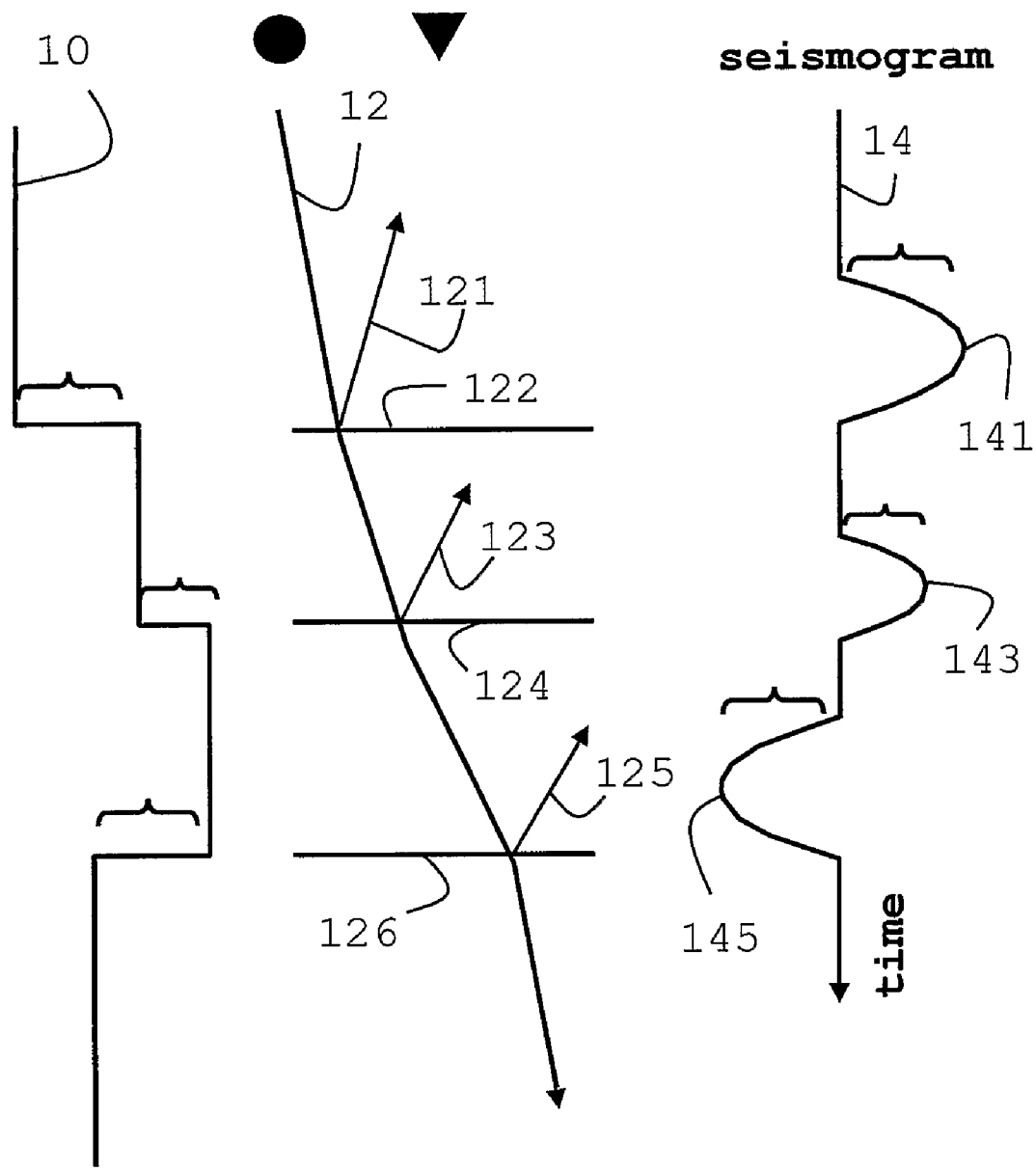
FIG. 1 is a schematic reflection seismogram based on a simple layer and velocity model.
Figure 2:
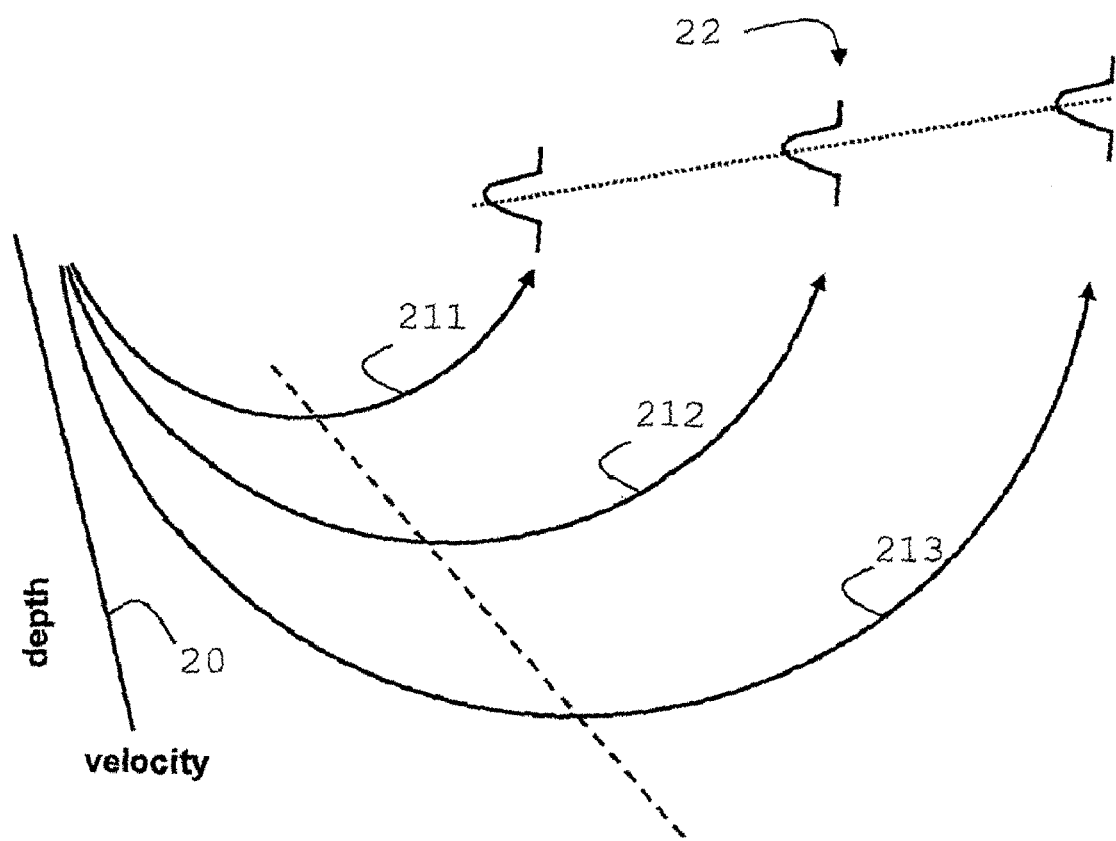
FIG. 2 illustrates the known use of turning wave detection.

FIG. 1 and FIG. 2 show known properties of reflection and turning wave seismograms, respectively. Both simplified and schematic diagrams serve to illustrate key differences to the treatment of turning waves in accordance with the present invention, an example of which is shown in FIG. 3.

FIG. 1 has three parts, showing from left to right a velocity profile 10 with depth, a ray path 12 of a seismic signal with reflected parts 121, 123, 125 at each layer boundary 122, 124, 126 and a seismogram 14 as would be registered by a receiver on the surface.

The seismogram registers the two reflections 121, 123 at layers 122, 124 with positive amplitudes 141, 143, whilst the third reflection 125 caused by a negative step in the magnitude of the velocity at the surface 126 is shown an amplitude 145 with a phase shift of 180 degrees. In principle, a single angle of incidence or horizontal slowness is sufficient to deduce from the seismogram the layered structure. By monitoring the traveltime and the amplitudes of the reflections, it is possible to locate depth and velocity contrast successively at each layer boundary. This process can be referred to as the basic layer stripping. By combining and matching a multitude of angles of incidence or horizontal slownesses, redundancy is obtained and it is possible to determine a probable velocity model 10 even in the presence of noise.

In FIG. 2 there is shown a smooth velocity profile 20, the ray paths 211, 212, 213 of three turning waves and their respective arrival time curve 22. Turning-waves are considered to be dominant in smooth and simple velocity models or at low frequencies of the recorded data and it is only at later stages of waveform inversion, with finer structures approaching interfaces, that backscattered or reflected signals become important. For turning waves, the essential information comes from evaluating the data derived from a range of lateral slownesses, each of which provides information about a different depth of the earth. It should be noted that this is in clear contrast to the use of multiple slownesses to provide redundancy in the backscattering case (FIG. 1). In turning wave inversion, the varying slope of the turning-wave traveltime curve, the moveout of the turning points with depth and the velocity gradient at depth are closely interrelated. The Herglotz-Wiechert-Bateman equation mentioned above exploits this relationship by enabling the conversion of an arrival time curve into a velocity depth profile in a laterally homogeneous earth.

Figure 3A:
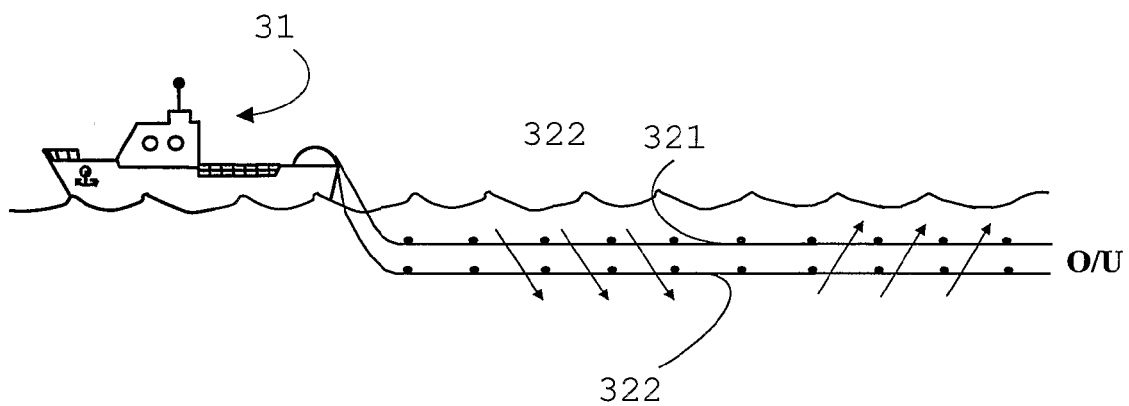
FIG. 3 illustrates the acquisition (FIG. 3A) and the use of turning waves (FIG. 3B) in accordance with an example of the present invention.

In FIG. 3, elements of the present invention are illustrated schematically. FIG. 3A shows a marine seismic signal acquisition using a vessel 31 towing two marine receiver cables or streamers 321, 322 in a configuration which is known as over/under (O/U) configuration. The O/U configuration provides essentially two pluralities of receivers which are vertically separated. The vertical separation enables the operator to not only measure the wavefield (in the marine case the pressure field) along a horizontal line, but also a vertical derivative. As known in the art, it has been contemplated to record vertical and/or horizontal derivatives using vertically separated receivers within a single cable, being easier to deploy than streamers in an O/U configuration.

In the case of land acquisition or ocean bottom marine acquisition, it is known that derivatives of the wavefield can be measured directly using sensors sensitive to displacement.

Figure 3B:
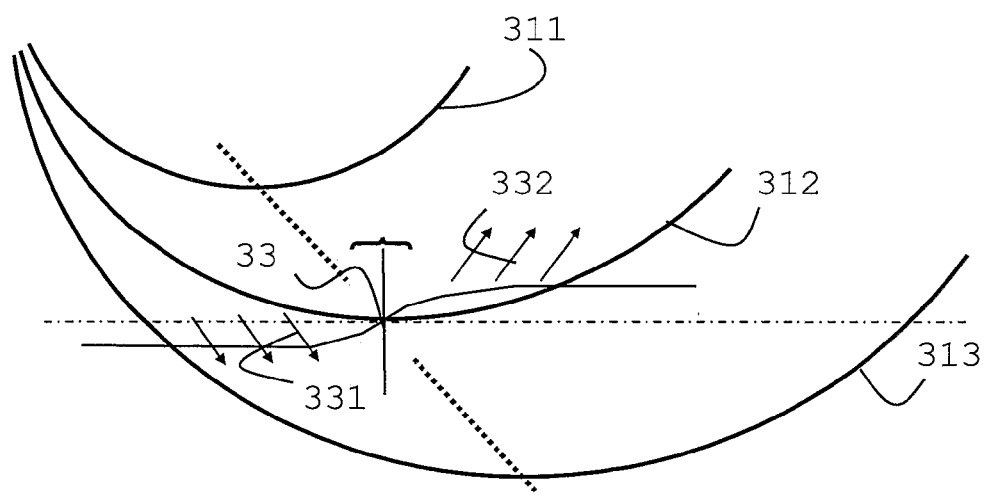

Independent of the measurement method applied, it is important for the purpose of the present invention that information about the vertical propagation direction is available either directly or indirectly from the recorded data. The knowledge of such information permits the decomposition into up- and downgoing parts of ray paths 311, 312, 313 of three turning waves as indicated in FIG. 3B. The wavefield of the second wave 312 is shown in more detail at the turning point, 33. As indicated by groups of parallel arrows 331, 332 it is at this point that the downgoing wave turns into an upgoing wave.

In the following it is described how after assuming a survey sinking to a depth $z_\alpha$ in the Earth has been preformed using a prior iteration of the method, a further step of the method is applied at such depth $z_\alpha$. This assumption is equivalent to having the data that would have been collected in the absence of all structures above this depth, including the free surface. The incident wave at this level $z_\alpha$, however, still depends on the true surface-source location and on the true structure above through which it has passed. For the purpose of modeling and/or inversion, one may imagine this incident wave to be have been created by an equivalent source distribution in an upper halfspace with the properties of the earth layer just above $z_\alpha$.

The upgoing reflection response at $z_\alpha$ only contains reflections, internal Multiples, and perhaps trapped waves, due to the earth structures below $z_\alpha$. Signals caused by up-to-down reflection at shallower interfaces have all been removed by the survey-sinking process. The free-surface reflection is the primary example of such an up-to-down event and it is well known that free-surface effects can be removed from data using only knowledge of the surface structure together with up/down decomposition, for example by applying methods outlined in: Amundsen, L., Elimination of free-surface multiples without need of the source wavelet, Geophysics, 66, 327-341 (2001).

This application of the inventive method extends not only to the free-surface multiples but also to the removal of internal-interface multiples during layer stripping, via a de-reverberation procedure. Such a procedure can be derived from reversing for example the known invariant-embedding methods or forward modeling methods for, building up the reflection response of a medium by the recursive addition of new layers and interfaces.

Given hence that the survey is sunk to level $z_\alpha$ as described above, the following steps describe how the material properties in the next depth layer or more generally in the next subinterval can be determined using turning waveforms just above such a layer or subinterval.

The known wavefield at depth $z_\alpha$ has been characterized as incident (nominally downgoing) and reflected (nominally upgoing) energy or, equivalently and in fact more preferably, as the wavefield and its vertical spatial derivative. These fields are then refined into components which include partial or total reflections, turning waves and sometimes also horizontal energy associated with trapped modes. These are the most likely manifestations of seismic energy which may appear in the recorded data.

The computational tools for the up/down splitting and the wavefield characterization exist. For the present example a splitting operator is used described in more detail in: Weston, V. H., 1989. Wave splitting and the reflection operator for the wave equation in $R^3$, J. Math. Phys., 30, 2545-2562 (1989).

Though this operator has not been, previously used or proposed as a way to identify a turning wave part of the recorded wavefield, it represents an intrinsic property of the medium and so it does not depend on the ambient wavefield. It is an important aspect of the present invention to have established theoretically and numerically (FIG. 4) that the Weston operator remains valid for turning waves in a medium with a velocity gradient.

The above wavefield analysis tools can be used either in a manual way or one may envisage an automated application. For the following it is assumed that a turning wavefield has been identified for some lateral position x at level $z_\alpha$ (for the 2D case). Partially backscattered waves are not further considered.

The turning wave components of the wavefield are then analyzed based on the definitions and steps listed below:
1. Given are the wavefield u and its derivative $\partial_z u$ at level $z_\alpha$ containing the turning point at lateral position x. Also given is the velocity v at depth $z_\alpha$.
2. Introduce local Cartesian coordinates: $(x,z) \rightarrow (s,n)$; n the upwardly oriented normal to the level surface; the turning point is at $(s,n)=(0,0)$.
3. Denote the velocity at level $z_\alpha$ as $v_0(s)=v(s,0)$; denote the turning-point value by $v_{00}=v(0,0)$.
4. Introduce the local lateral reference phase:

$$\tau_0(s) = \int_0^s \frac{ds}{v_0(s)}.$$

5. Introduce the turning-ray curvature $1/P_0 = -(\partial_n v)/v$ at $(0,0)$, where $\partial_n v$ denotes the normal gradient of the velocity v in the next sub-interval or depth interval. This earth velocity gradient $\partial_n v$ is the quantity to be determined from the wavefield u and the wavefield gradient $\partial_z u$ at the current depth.
6. Introduce the scaled coordinates $(s,n) \rightarrow (\sigma, \nu)$ given by $$\sigma = \frac{1}{2}\omega^{\frac{1}{3}} v_{00} \left(\frac{2}{v_{00}^2 P_0}\right)^{\frac{2}{3}} s \text{ and}$$

$$\nu = \omega^{\frac{2}{3}} \left(\frac{2}{v_{00}^2 P_0}\right)^{\frac{1}{3}} n$$

With these definitions, the canonical wavefunction for a wavefield around a turning point may be written as $$u(s,n) = u(0,0) e^{i\omega \tau_0} \int_{-\infty}^{\infty} Ai(\varsigma - \nu) e^{i\varsigma\sigma} d\varsigma + O(\omega^{-\frac{1}{3}}) \qquad [1]$$

as described in: Thomson, C. J., Corrections for grazing rays in 2-D seismic modelling, Geophys. J., 96, 415-446 (1989). The expression [1] is a local approximation and $\zeta$ is the scaled local lateral slowness (relative to $\tau_0$). Expression [1] represents a sum over a range of such slownesses and hence properties at a corresponding range of depths as explained when describing FIG. 2 above. Ai is the Airy function of the first kind and it contains the z dependence via $\nu$.

The vertical derivative $\partial_z u$ therefore has the form:

$$\partial_z u(s,n) = u(0,0)(-\partial_z \nu) e^{i\omega \tau_0} \int_{-\infty}^{\infty} Ai'(\varsigma - \nu) e^{i\varsigma\sigma} d\varsigma + O(\omega^{-\frac{1}{3}}) \qquad [2]$$

where Ai' is the Airy derivative w.r.t. its argument.

Given these definitions and expressions an example according to present invention includes the following steps:
1. Use a window to limit the wavefield u and its derivative $\partial_z u$ in lateral position and time, i.e., (x,t), to isolate waves around the turning point at level $z_\alpha$.
2. Transform the data into the frequency/horizontal-slowness (or wavenumber) domain $t \rightarrow \omega$, $x \rightarrow p$(or k).
3. Select the values of wavefield u and its derivative $\partial_z u$ at the turning slowness $P=1/v_{00}$
4. These values are then used on the left-hand side of the following expression, which is derived from the canonical wavefunctions (equations [1] and [2]) in the slowness domain:

$$\left.\frac{\partial_z u}{u}\right|_{p=1/v00} = (-\partial_z \nu)\frac{Ai'(0)}{Ai(0)} \qquad [3]$$

The equation [3] provides the value of $\partial_z V$ and thus, by using in turn the definition of $\nu$ given above under point 6, the velocity gradient $\partial_n v$ (see point 5 above) of the layer or subinterval directly below $z_\alpha$ is obtained from the wavefield and its gradient at that depth and location x.

Alternatively to the use of equation [3] in the slowness domain a similar expression can be derived for the space(x) domain starting from the local expression $$u(\sigma, v) \approx u(0,0)e^{i\omega\tau_0(s)}e^{i(\sigma v - \sigma_{**}3/3)} + O(\omega^{-\frac{1}{3}}) \quad [4]$$

as described by Thomson, C. J., Corrections for grazing rays in 2-D seismic modelling, Geophys. J., 96, 415-446 (1989) and further making use of $\partial_z u/u$ being therefore locally $$\frac{\partial_z u}{u} \approx i\sigma \partial_z v. \quad [5]$$

Since expression [5] is linear in σ, s or x, a slope measurement at the turning point gives $\partial_z v$, i.e., $P_0$ and hence the earth velocity gradient $\partial_z v$.

Once the velocity gradient in the next subinterval is found, it is combined with the known velocity at the current depth to find the velocity at the next depth. De-reverberation or multiple removal as referred to above is now performed and the process can be moved one depth step deeper.

In the above example v can be either the p-wave or s-wave wave velocity. From knowledge of the p-wave and s-wave wave velocities, respectively, the Poisson ratio can be obtained using their squared ratio.

Figure 4A:
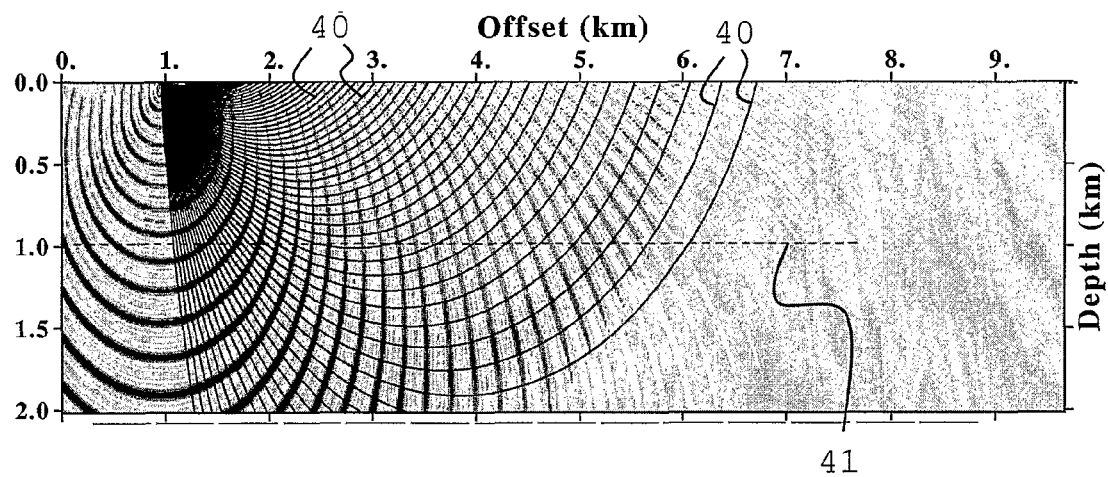
FIG. 4A,B illustrate further details of a wavefield inversion in accordance with an example of the invention using a synthetic model.

For a simplified numerical example, FIG. 4A shows rays 40 and the real part of the finite-difference turning wavefield for 16 Hz in a model with a constant velocity gradient. The wavefield and its vertical derivative are sampled parallel to the horizontal axis at a depth just less than 1 km, as indicated by dashed line 41.

Figure 4B:
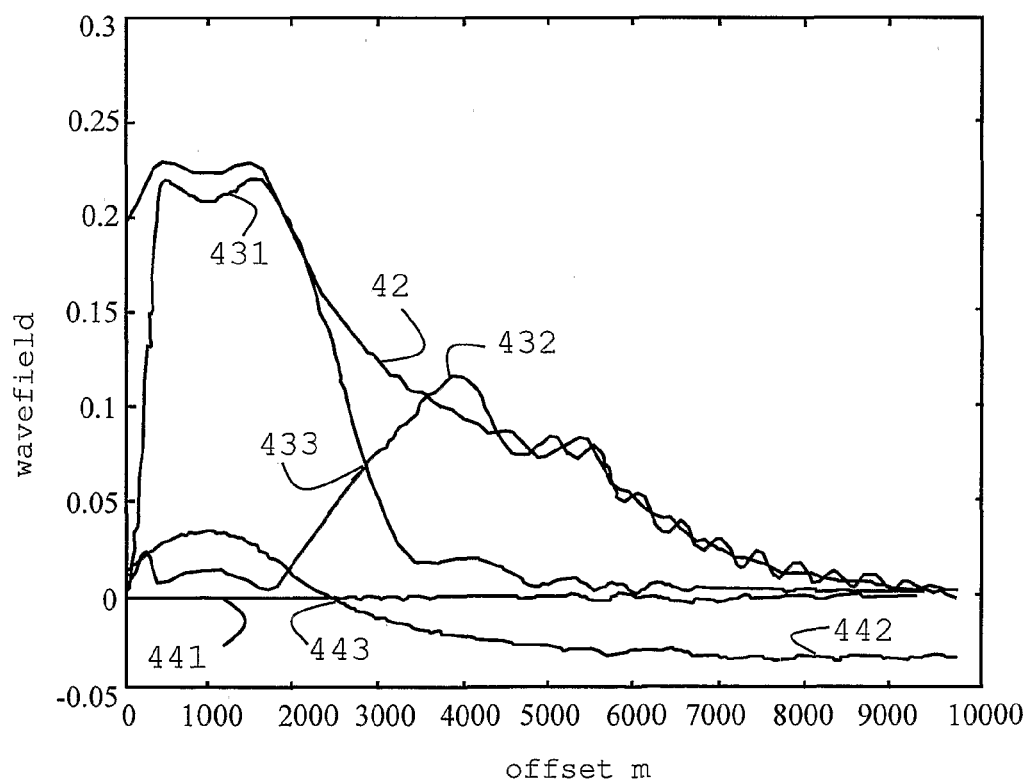

In FIG. 4B there is shown the magnitude of the total wavefield 42 at this depth, and the magnitudes of the downgoing wavefield 431 and upgoing wavefield 432, respectively. The latter split wavefields are computed using a computer program that implements the Weston operator. The split is broadly consistent with the rays and the total wavefield as shown in FIG. 4A, though evidently the finite-difference wavefield has limited accuracy causing fluctuations.

The cross-over 433 between the down- and upgoing waves gives an approximate measure of the (offset) position of the turning point at the chosen depth of just less than 1 km. However a more accurate measure of the turning point can be gained using the real part 441 and imaginary part 442 of $\partial_z u/u$ as defined above. The former is essentially zero for this simple case and the latter reveals both the amplitude maximum directly below the source (i.e. at left) and the crucial sign change at the improved estimate of the position of the turning point 443.

A simple estimate of the gradient at the crossover of the curve 442 of the imaginary part is found to yield the velocity gradient with satisfactory accuracy (1.23 s$^{-1}$ as opposed to a true value of 1.24 s$^{-1}$ in this particular model).

Given the knowledge of an initial velocity v, the wavefield u and its gradient $\partial_z u$, which could be the values at the surface layer, the above methods generate a data set of velocities/slownesses versus depth.

Figure 5:
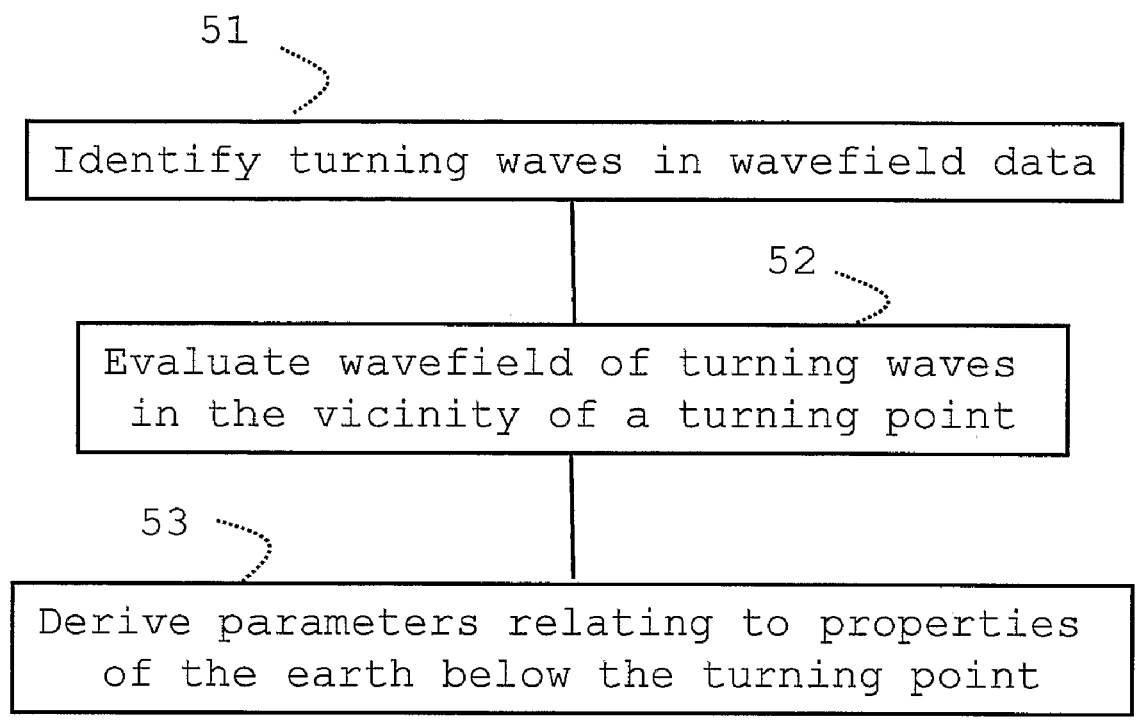
FIG. 5 is a block diagram of steps in accordance with an example of the present invention.

In FIG. 5, the steps of the above example are summarized as identifying the part of the wavefield which represents turning waves 51, evaluating the wavefield in the vicinity of a turning point 52, and determining from that evaluation parameters of the earth immediately below the turning point 53. These steps are described in more detail above.

As the invention is based on an inversion of turning wave energy, such velocity models will provide a better representation of the earth structure as revealed by longer wavelengths than conventional back-scattering approaches utilizing shorter wavelengths.

The velocities as derived from the turning wave inversion can in turn be used in many seismic data processing operations. For example, the derived results can serve as a starting point or benchmark in conventional velocity analysis or as a velocity model for the purpose of traveltime analysis, migration or imaging, or other processing steps aimed at focusing events to their true locations and thus providing a more accurate image of reflector locations.

The invention claimed is:

1. A method of processing seismic signals recorded by seismic receivers in response to a seismic wavefield generated by a seismic source emission, comprising the steps of:
    using the seismic signals to determine a location of a turning point in a sub-surface of the earth, wherein the turning point comprises a location at a level $z_\alpha$ where a seismic wave generated by the seismic source propagates parallel to the level $z_\alpha$ at the turning point and on a first side of the turning point the seismic wave is downgoing and on a second side of the turning point the seismic wave is upgoing;
    determining properties of a total wavefield at level $z_\alpha$ wherein the properties of the total wavefield are determined from the seismic wavefield and a structure of the earth above the level $z_\alpha$ and wherein the total wavefield comprises the seismic wavefield and a vertical derivative of the seismic wavefield;
    using the properties of the total wavefield at level $z_\alpha$ to process parameters characterizing properties of the earth or sub-sections of the earth in a vicinity of the turning point; and
    using the processed parameters to interpret the seismic signals to generate an image of the sub-surface of the earth.

2. The method of claim 1 wherein the earth or sub-sections of the earth are evaluated for presence of hydrocarbon reservoirs.

3. The method of claim 1 wherein the parameters represent or are equivalent to velocity or slowness and/or the gradient of the velocity or the slowness.

4. The method of claim further comprising, separating the downgoing and the upgoing reflection at level $z_\alpha$.

5. The method of claim 1. wherein the parameters comprise a gradient of a medium wavespeed at a depth deeper than level $z_\alpha$.

6. The method of claim 1 further comprising the step of comparing data related to the energy of the wavefield between locations in the vicinity of the turning point.

7. The method of claim 6 wherein the data related to the energy of the wavefield is selected from a group consisting of energy, energy density, amplitudes and gradients thereof.

8. The method of claim 1 further comprising using the parameters to estimate properties of a surface having a depth below level $Z_a$.

9. The method of claim 8 performed as an iterative method wherein the deeper surface is defined as a new survey surface.

10. The method of claim 8 wherein the step of determining the parameters is performed prior to the estimation of the properties of the deeper surface.

11. The method of claim 1 wherein the seismic signals are processed to identify components representing turning-wave signals.

12. The method of claim 11 comprising the step of processing the seismic signals with a splitting operator depending only on local intrinsic properties of the medium.

13. The method of claim 12 wherein the operator is a splitting Weston-type operator, applied in either the time or frequency domain.

14. The method of claim 11 wherein the seismic signals are bandlimited to a frequency range under 10Hz.

15. The method of claim 1 wherein the turning point is estimated by a comparison of data representing a downgoing and an upgoing wavefield, respectively.

16. The method of claim 1 wherein the turning point is estimated by locating the sign change of data representing an imaginary part of a quotient of vertical derivative of a wavefield and the wavefield.

17. The method of claim 1 wherein the parameters are determined by evaluating data representing an imaginary part of a quotient of vertical derivative of a wavefield and the wavefield at the location of the turning point.

18. The method of claim 1 comprising the further step of using the parameters to obtain a velocity model of the earth.

19. The method of claim 18 comprising the step of using the velocity model as a low-frequency approximation in a further processing step of velocity analysis.

20. The method of claim 18 comprising the further step of combining, the velocity model with data obtained from an analysis of reflected seismic waves to obtain a refined velocity model of the earth.

* * * * *